United States Patent
Iwakuni

(10) Patent No.: US 11,072,695 B2
(45) Date of Patent: *Jul. 27, 2021

(54) RUBBER COMPOSITION FOR STUDLESS TIRE AND STUDLESS TIRE

(71) Applicant: TOYO TIRE CORPORATION, Itami (JP)

(72) Inventor: Keisuke Iwakuni, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 138 days.

This patent is subject to a terminal disclaimer.

(21) Appl. No.: 16/340,444

(22) PCT Filed: Nov. 8, 2017

(86) PCT No.: PCT/JP2017/040299
§ 371 (c)(1),
(2) Date: Apr. 9, 2019

(87) PCT Pub. No.: WO2018/100994
PCT Pub. Date: Jun. 7, 2018

(65) Prior Publication Data
US 2019/0225776 A1    Jul. 25, 2019

(30) Foreign Application Priority Data

Nov. 30, 2016   (JP) ............... JP2016-233001

(51) Int. Cl.
| | | |
|---|---|---|
| C08L 7/00 | (2006.01) |
| C08L 9/06 | (2006.01) |
| C08L 15/00 | (2006.01) |
| B60C 1/00 | (2006.01) |
| B60C 11/00 | (2006.01) |
| C08L 101/00 | (2006.01) |
| C08L 91/00 | (2006.01) |
| C08L 9/00 | (2006.01) |

(52) U.S. Cl.
CPC .............. C08L 7/00 (2013.01); B60C 1/0016 (2013.01); B60C 11/0008 (2013.01); C08L 9/00 (2013.01); C08L 9/06 (2013.01); C08L 15/00 (2013.01); C08L 91/00 (2013.01); C08L 101/00 (2013.01); *C08L 2205/025* (2013.01); *C08L 2205/035* (2013.01); *C08L 2207/322* (2013.01); *Y02T 10/86* (2013.01)

(58) Field of Classification Search
CPC ... C08L 7/00; C08L 9/06; C08L 15/00; B60C 1/00; B60C 11/00
USPC .......................................... 524/526
See application file for complete search history.

(56) References Cited

U.S. PATENT DOCUMENTS

| | | | |
|---|---|---|---|
| 10,472,501 B2 * | 11/2019 | Iwakuni ................... C08L 7/00 |
| 2009/0205816 A1 * | 8/2009 | De .......................... C08L 23/16 |
| | | | 166/118 |
| 2016/0237253 A1 | 8/2016 | Kakubo et al. | |

FOREIGN PATENT DOCUMENTS

| | | |
|---|---|---|
| CN | 105579512 A | 5/2016 |
| JP | 1-163228 A | 6/1989 |
| JP | 11-172048 A | 6/1999 |
| JP | H11-172048 A * | 6/1999 |
| JP | 2000-247105 A | 9/2000 |
| JP | 2006-199832 A | 8/2006 |
| JP | 2010-209174 A | 9/2010 |

OTHER PUBLICATIONS

International Search Report dated Jan. 23, 2018, issued in counterpart International Application No. PCT/JP2017/040299 (1 page).
Office Action dated Nov. 2, 2020, issued in counterpart CN Application No. 201780063548.2, with English translation (10 pages).

* cited by examiner

*Primary Examiner* — Deve V Hall
(74) *Attorney, Agent, or Firm* — Westerman, Hattori, Daniels & Adrian, LLP

(57) ABSTRACT

A rubber composition for a studless tire according to an embodiment includes a rubber component containing a natural rubber and a polybutadiene rubber; oil-absorbent polymer particles having a glass transition temperature of −70 to −20° C., formed from a polymer whose molecular weight distribution is less than 3.0, and having an oil absorption of 100 to 1,500 ml/100 g; and an oil. The content of the oil-absorbent polymer particles is 0.5 to 25 parts by mass per 100 parts by mass of the rubber component. As a result, on-ice performance and rolling resistance performance can be improved.

6 Claims, No Drawings

RUBBER COMPOSITION FOR STUDLESS TIRE AND STUDLESS TIRE

TECHNICAL FIELD

The present invention relates to a rubber composition used for the tread rubber of a studless tire and also to a studless tire using the same. A studless tire is a type of snow tire, and is a snow tire in which non-skid studs are not embedded.

BACKGROUND ART

As pneumatic tires for running on an icy road surface, studless tires are known. In a studless tire, as well as improving running performance on an icy road surface (i.e., on-ice performance), in terms of the recent environmental impact reduction, it is desirable to also improve rolling resistance performance at the same time.

Incidentally, PTL 1 discloses that an oil gelling agent (e.g., N-lauroyl-L-glutamic acid-α,γ-di-n-butylamide) is added to an antioxidant, and the resulting gelled product is blended into a rubber composition. However, disclosed is a technology of using an oil gelling agent in order to improve the ozone cracking resistance of an antioxidant, and there is no disclosure of using oil-absorbent polymer particles considering on-ice performance.

Meanwhile, PTLs 2 and 3 disclose that in order to suppress the hardening of rubber resulting from the running of the tire, an oil absorbent having an oil absorbing power of twice or more a process oil is blended together with a process oil into a rubber composition. It is also disclosed that as the oil absorbent, porous vinyl-based polymer gel particles obtained by the low-crosslinking polymerization of a polymer having high affinity to a process oil are used. However, in these literatures, the oil absorbent has the function of retaining the process oil in a rubber composition over a long period of time, and it is not disclosed that on-ice performance and rolling resistance performance are improved by the oil-absorbed polymer gel particles.

CITATION LIST

Patent Literature

PTL 1: JP-A-H1-163228
PTL 2: JP-A-H11-172048
PTL 3: JP-A-2000-247105

SUMMARY OF INVENTION

Technical Problem

In light of the above points, an object of the invention is to provide a rubber composition for a studless tire, which is capable of improving on-ice performance and rolling resistance performance.

Solution to Problem

A rubber composition for a studless tire according to this embodiment includes a rubber component containing a natural rubber and a polybutadiene rubber; oil-absorbent polymer particles having a glass transition temperature of −70 to −20° C., formed from a polymer whose molecular weight distribution is less than 3.0, and having an oil absorption of 100 to 1,500 ml/100 g; and an oil. The content of the oil-absorbent polymer particles is 0.5 to 25 parts by mass per 100 parts by mass of the rubber component.

A studless tire according to this embodiment includes a tread rubber including the above rubber composition.

Advantageous Effects of Invention

According to this embodiment, on-ice performance and rolling resistance performance can be improved.

DESCRIPTION OF EMBODIMENTS

Hereinafter, matters relevant to the practice of the invention will be described in detail.

The rubber composition according to this embodiment is a blend of a rubber component containing a natural rubber and a polybutadiene rubber; oil-absorbent polymer particles; and an oil.

In the rubber component, the ratio of the natural rubber (NR) and the polybutadiene rubber (BR) is not particularly limited. For example, as one embodiment, 100 parts by mass of the rubber component may contain 15 to 75 parts by mass of the natural rubber and 25 to 85 parts by mass of the polybutadiene rubber, or may alternatively contain 50 to 70 parts by mass of the natural rubber and 30 to 50 parts by mass of the polybutadiene rubber.

Together with the natural rubber and the polybutadiene rubber, the rubber component may also contain a styrene-butadiene rubber (SBR). The ratio of these three components is not particularly limited. For example, as one embodiment 100 parts by mass of the rubber component may contain 15 to 70 parts by mass of the natural rubber, 25 to 80 parts by mass of the polybutadiene rubber, and 0 to 45 parts by mass of the styrene-butadiene rubber, or may alternatively contain 15 to 70 parts by mass of the natural rubber, 25 to 80 parts by mass of the polybutadiene rubber, and 5 to 45 parts by mass of the styrene-butadiene rubber. 100 parts by mass of the rubber component may contain 25 to 60 parts by mass of the natural rubber, 25 to 50 parts by mass of the polybutadiene rubber, and 0 to 40 parts by mass of the styrene-butadiene rubber, may contain 25 to 60 parts by mass of the natural rubber, 25 to 50 parts by mass of the polybutadiene rubber, and 5 to 40 parts by mass it the styrene-butadiene rubber, or may alternatively contain 25 to 40 parts by mass of the natural rubber, 25 to 40 parts by mass of the polybutadiene rubber, and 20 to 40 parts by mass of the styrene-butadiene rubber.

As the styrene-butadiene rubber, a solution-polymerized styrene-butadiene rubber (SSBR) or an emulsion-polymerized styrene-butadiene rubber (ESBR) may be used. In addition, it is also possible to use a modified styrene-butadiene rubber (modified SBR) modified with a functional group that interacts with silanol groups on the surface of silica, and, as one embodiment, a modified SSBR may also be used. Examples of functional groups of the modified SBR include an amino group, an alkoxyl group, and a hydroxy group. These functional groups may be introduced alone, or alternatively it is also possible to introduce a combination of two or more kinds. That is, as the modified SBR, one having at least one functional group selected from the group consisting of an amino group, an alkoxyl group, and a hydroxy group can be mentioned. The functional group may be introduced into the molecular terminals or may alternatively be introduced into the molecular chain.

Incidentally, in the rubber component, in addition to the above NR, BR, and SBR, as long as the advantageous effects of the invention are not impaired, other diene-based rubbers may also be contained.

As the oil-absorbent polymer particles, polymer particles having a glass transition temperature of −70 to −20° C., formed of a polymer whose molecular weight distribution is less than 3.0, and having an oil absorption of 100 to 1,500 ml/100 g are used. When such oil-absorbent polymer particles are blended into the rubber component containing NR/BR together with an oil, on-ice performance and rolling resistance performance can be improved in a well-balanced manner. The reasons therefor are believed to be as follows. That is, the oil-absorbent polymer particles are gelled (i.e., swollen) with the oil, and the gelled oil-absorbent polymer particles form, as a dispersed phase dispersed in a matrix (continuous phase) comprising the rubber component, a filler non-localized phase containing no filler. The filler non-localized phase is also a micro-flexible phase and facilitates adhering to the road surface. In addition, because the filler non-localized phase has a low glass transition temperature, the adhesion to the road surface in a low temperature region is enhanced. This presumably results in improved on-ice performance. In addition, because oil-absorbent polymer particles having a small molecular weight distribution are used, low heat generation performance is improved, presumably resulting in improved rolling resistance performance of the tire.

The oil-absorbent polymer particles have an oil absorption of 100 to 1,500 ml/100 g. When such oil-absorbent polymer particles having a high oil absorption are used, on-ice performance can be improved. In addition, because the oil absorption is 1,500 ml/100 g or less, a decrease in abrasion resistance can be suppressed. The oil absorption of the oil-absorbent polymer particles is preferably 300 to 1,300 ml/100 g, more preferably 500 to 1,200 ml/100 g, and may also be 800 to 1,200 ml/100 g. Here, the oil absorption is the maximum amount of oil that can be absorbed per 100 g of the oil-absorbent polymer particles (oil absorption at saturation) and is a value measured in accordance with JIS K5101-13-1.

The oil-absorbent polymer particles have a glass transition temperature (Tg) of −70 to −20° C. When such oil-absorbent polymer particles having a low glass transition temperature are used, the adhesion to the road surface in a low temperature region can be enhanced to improve on-ice performance. In addition, a glass transition temperature of −70° C. or more is advantageous in improving rolling resistance performance. The glass transition temperature of the oil-absorbent polymer particles is preferably −60 to −40° C. and may also be −60 to −50° C. Here, the glass transition temperature is a value measured using differential scanning calorimetry (DSC) in accordance with JIS K7121 (temperature rise rate: 20° C./min).

The oil-absorbent polymer particles are formed of a polymer having a molecular weight distribution (Mw/Mn) of less than 3.0. When the molecular weight distribution is less than 3.0, deterioration of low heat generation performance can be suppressed, and deterioration of the rolling resistance performance of the tire can be suppressed. The molecular weight distribution is preferably 2.0 or less, more preferably 1.5 or less, and may also be 1.2 or less. The lower limit of the molecular weight distribution is not particularly set, and should be 1 or more and may also be 1.1 or more. Here, the molecular weight distribution is the ratio of the weight average molecular weight (Mw) relative to the number average molecular weight (Mn) of the polymer. Mn and Mw are values calculated in terms of standard polystyrene using GPC (gel permeation chromatography) and can be determined as follows, for example. 0.2 mg of a measurement sample dissolved in 1 mL of THF is, after filter penetration using "LC-20DA" manufactured by Shimadzu Corporation, passed through columns ("PL Gel 3 μm Guard×2" manufactured by Polymer Laboratories) at a temperature of 40° C. and a flow rate of 0.7 mL/min, followed by detection using "RI Detector" manufactured by Spectra System.

The average particle size of the oil-absorbent polymer particles (average particle size with no oil absorbed) is not particularly limited, and may be, for example, 10 to 1,000 μm, 100 to 800 μm, or 300 to 700 μm. Here, the average particle size can be determined as follows. Using an image obtained by observation under a scanning electron microscope (SEM), the diameters of randomly sampled 50 particles are measured, and their arithmetic average is determined as the average particle size. The diameter of a particle can be determined as follows, for example. Using an image processing software "Image-Pro Plus" manufactured by Media Cybernetics, the length of a line connecting two points on the circumference and passing through the center of gravity of the particle is measured at 2° intervals, and the average of the measured values is used as the diameter.

In one embodiment, the oil-absorbent polymer particles may be formed from copolymer having a styrene unit and an ethylene unit as repeating units. In addition, in one embodiment, the oil-absorbent polymer particles may also be porous particles.

As oil-absorbent polymer particles having such properties, "Aqua N-Cap" is commercially available from Meitoh Kasei Co., Ltd., and can be preferably used. Aqua N-Cap is a granular powder formed from a thermoplastic block copolymer and is oil-absorbent thermoplastic polymer particles. Aqua N-Cap is lipophilic and hydrophobic, that is, absorbs oil but does not absorb water, and is capable of oil micro-encapsulation.

The content of the oil-absorbent polymer particles in the rubber composition is preferably 0.5 to 25 parts by mass per 100 parts by mass of the rubber component. When the content is 0.5 parts by mass or more, on-ice performance and rolling resistance performance can be improved, while when the content is 25 parts by mass or less, a decrease in abrasion resistance can be suppressed. The content of the oil-absorbent polymer particles is preferably 1 to 20 parts by mass, more preferably 2 to 15 parts by mass, per 100 parts by mass of the rubber component.

As the oil, any of various oils blended into a rubber composition can be used. Preferably, as the oil, a mineral oil containing a hydrocarbon as a main component is used. That is, it is preferable to use at least one mineral oil selected from the group consisting of paraffinic oils, naphthenic oils, and aromatic oils.

In terms of enhancing the effect of achieving both on-ice performance and rolling resistance performance, it is preferable that the content ratio between the oil and the oil-absorbent polymer particles is set as follows. That is, it is preferable that the oil content (A) is 1 to 15 times the oil-absorbent polymer particle content (B) on mass basis ((A)/(B)=1 to 15). (A)/(B) is more preferably 2 to 10.

In one embodiment, the oil-absorbent polymer particles and the oil may be blended as an oil-polymer composite obtained by absorbing the oil into the oil-absorbent polymer particles. That is, it is possible that oil-absorbent polymer particles and an oil are previously mixed to absorb the oil into the oil-absorbent polymer particles, and the resulting oil-containing oil-absorbent polymer particles are added to a rubber component and mixed.

Incidentally, the content of the oil in the rubber composition is not particularly limited, and may be, for example, 5 to 40 parts by mass or 10 to 30 parts by mass per 100 parts by mass of the rubber component.

In the rubber composition according to this embodiment, in addition to the components described above, formulated chemicals used in the usual rubber industry, such as carbon black, silica, and like reinforcing fillers, zinc oxide, stearic acid, waxes, antioxidants (amine-ketone-based, aromatic secondary amine-based, phenol-based, imidazole-based, etc.), vulcanizers, and vulcanization accelerators (guanidine-based, thiazole-based, sulfenamide-based, thiuram-based, etc.), can be suitably blended within the usual ranges.

Carbon black as a reinforcing filler (i.e., filler) is not particularly limited, and various known species can be used. For example, it is preferable to use carbon black of SAF grade (N 100s), ISAF grade (N 200s), HAF grade (N 300s), or FEF grade (N 500s) (all ASTM grades). These grades of carbon black may be used alone, and it is also possible to use a combination of two or more kinds.

Silica is not particularly limited either, but it is preferable to use wet silica, such as wet-precipitated silica or wet-gelled silica. In the case where silica is blended, a silane coupling agent, such as sulfide silane or mercapto silane, is preferably blended together, and the amount thereof blended is preferably 2 to 20 mass % relative to the amount of silica blended.

It is preferable that the reinforcing filler contains carbon black as a main component, that is, it is preferable that more than 50 mass % of the reinforcing filler is carbon black. It is more preferable that 70 mass % or more of the reinforcing filler is carbon black. The content of the reinforcing filler in the rubber composition is not particularly limited, and may be 20 to 150 parts by mass, 30 to 100 parts by mass, or 40 to 80 parts by mass per 100 parts by mass of the rubber component. The reinforcing filler is preferably carbon black alone or a combination of carbon black and silica. The content of carbon black in the rubber composition is not particularly limited, and may be 15 to 100 parts by mass, 20 to 80 parts by mass, or 30 to 60 parts by mass per 100 parts by mass of the rubber component.

Examples of the vulcanizers include sulfur such as powder sulfur, precipitated sulfur, colloidal sulfur, insoluble sulfur, and highly dispersed sulfur. The amount thereof blended is not particularly limited, but is preferably 0.1 to 5 parts by mass, more preferably 0.5 to 3 parts by mass, per 100 parts by mass of the rubber component. In addition, the amount of vulcanization accelerator blended is preferably 0.1 to 5 parts by mass, more preferably 0.5 to 3 parts by mass, per 100 parts by mass of the rubber component.

In addition, in order to further improve on-ice performance, the rubber composition according to this embodiment may contain at least one antiskid material selected from the group consisting of ground products of porous carbonized products of plants, porous cellulose particles, and plant-derived granular bodies.

Here, ground products of porous carbonized products are obtained by grinding a porous substance formed of a carbon-based solid product obtained by carbonizing a plant such as wood or bamboo as a material. Examples thereof include a ground product of bamboo charcoal (bamboo charcoal ground product). In addition, as porous cellulose particles, cellulose particles obtained by adding a porosifying agent to an alkaline cellulose solution such as viscose, thereby allowing the coagulation/reproduction of cellulose and foaming by the porosifying agent to simultaneously proceed, can be mentioned. Examples thereof include "Viscopearl" manufactured by Rengo Co., Ltd. As a plant-derived granular body, a ground product obtained by grinding at least one member selected from the group consisting of seed husks, fruit pits, grains, and cores thereof can be mentioned. Examples thereof include a ground product of walnuts.

The particle size of the antiskid material is not particularly limited, and the 90% volume particle size (D90) may be 5 to 1,000 µm, or 100 to 700 µm, for example. D90 means the particle size at an integrated value of 90% in the particle size distribution (volume basis) measured by a laser diffraction/scattering method. In the case where these antiskid materials are blended, the amount thereof blended is preferably 1 to 10 parts by mass per 100 parts by mass of the rubber component.

The rubber composition according to this embodiment can be produced by kneading in the usual manner using a mixer that is usually used, such as a Banbury mixer, a kneader, or a roll. For example, it is possible that in the non-productive mixing step, oil-absorbent polymer particles, an oil, and also other additives excluding a vulcanizer and a vulcanization accelerator are added to a rubber component and mixed, and subsequently, in the productive mixing step, a vulcanizer and a vulcanization accelerator are added to the obtained mixture and mixed, thereby preparing a rubber composition.

The rubber composition thus obtained is used for a tread rubber that forms the tread of a studless tire, which is a pneumatic tire. The studless tire may be a passenger car tire or a heavy-load tire for trucks and buses. The tread rubber of a studless tire has a two-layer structure including a cap rubber and a base rubber or a monolayer structure in which the two are integrated, and the rubber composition is preferably used for a rubber forming the tread. That is, in the case of a monolayer structure, it is preferable that the tread rubber includes the above rubber composition, while in the case of a two-layer structure, it is preferable that the cap rubber includes the above rubber composition.

The method for producing a studless tire is not particularly limited. For example, it is possible that the rubber composition is formed into a predetermined shape by extrusion in the usual manner to prepare an unvulcanized tread rubber member, and then the tread rubber member is combined with other members to prepare an unvulcanized tire (green tire), followed by vulcanization molding at 140 to 180° C., for example, thereby producing a studless tire.

EXAMPLES

Hereinafter, examples of the invention will be shown, but the invention is not limited to these examples.

Using a Banbury mixer, following the formulation (part by mass) shown in Table 1 below, first, in the non-productive mixing step, agents to be blended excluding sulfur and a vulcanization accelerator were added to a rubber component and kneaded (discharge temperature=160° C.), and subsequently, in the productive mixing step, sulfur and a vulcanization accelerator were added to the obtained mixture and kneaded (discharge temperature=90° C.), thereby preparing a rubber composition for a studless tire. The details of the components in Table 1 are as follows.

NR: Natural rubber, RSS #3

ESBR: "SBR0122" manufactured by JSR Corporation (Tg: −40° C.)

Modified SBR: Alkoxyl- and amino-terminated modified solution-polymerized SBR, "HPR350" manufactured by JSR Corporation BR: "BR150B" manufactured by Ube Industries, Ltd.

Carbon black: "SEAST KH (N339)" manufactured by Tokai Carbon Co., Ltd.

Silica: "Nipsil Q" manufactured by Tosoh Silica Corporation
Paraffinic oil: "PROCESS P200" manufactured by JX Nippon Oil & Energy Corporation
Silane coupling agent: "Si69" manufactured by Evonik
Oil-absorbent polymer particles: "Aqua N-Cap" manufactured by Meitoh Kasei Co., Ltd. (oil absorption: 1,000 ml/100 g, Tg: −51° C., average particle size: 500 μm, Mw: 99,000, Mn: 85,000, Mw/Mn: 1.2)
Polymethyl methacrylate: "Polymethyl Methacrylate" manufactured by Tokyo Chemical Industry Co., Ltd. (oil absorption: 46.8 ml/100 g, Tg: 90° C.)
Silicone resin powder: "Tospearl 2000B" manufactured by Momentive Performance Materials Japan LLC (oil absorption: 10.0 ml/100 g, average particle size: 7 μm)
Oil gelling agent: N-Lauroyl-L-glutamic acid-α,γ-di-n-butylamide, "COAGULAN GP-1" manufactured by Ajinomoto Co., Inc.
Plant-derived granular body: Walnut husk ground product ("SOFT GRIT #46" manufactured by Nippon Walnut Co., Ltd.) surface-treated with an RFL treatment liquid (main component: mixture of resorcin-formalin resin initial condensate and latex) (D90: 300 μm)
Stearic acid: "LUNAC S-20" manufactured by Kao Corporation
Zinc oxide: "Zinc Oxide No. 1" manufactured by Mitsui Mining & Smelting Co., Ltd.
Wax: "OZOACE 0355" manufactured by Nippon Seiro Co., Ltd.
Antioxidant: "Nocrac 6C" manufactured by Ouchi Shinko Chemical Industrial Co., Ltd.
Vulcanization accelerator: "Nocceler D" manufactured by Ouchi Shinko Chemical Industrial Co., Ltd.
Sulfur: "Powder Sulfur" manufactured by Tsurumi Chemical Industry Co., Ltd.

The obtained rubber composition was vulcanized at 160° C. for 30 minutes to give a test piece of a predetermined shape, and the abrasion resistance was evaluated. In addition, using each rubber composition, a studless tire for passenger cars was produced. The tire size was set at 215/45ZR17, and each rubber composition was applied as a tread rubber and subjected to vulcanization molding in the usual manner to produce a studless tire. The rolling resistance performance and on-ice performance of the obtained tire were evaluated. The evaluation methods are as follows.

Abrasion Resistance: In accordance with JIS K6264, using a Lambourn abrasion tester manufactured by Iwamoto Seisakusho Co., Ltd., the abrasion loss was measured under the conditions of a load of 40 N and a slip ratio of 30%, and the reciprocal of abrasion loss was expressed as an index taking the value of Comparative Example 1 as 100. A larger index indicates less abrasion loss and better abrasion resistance.

Rolling Resistance Performance: Using a rolling resistance measurement drum tester, the rolling resistance of each tire was measured under the conditions of a pneumatic pressure of 230 kPa, a load of 4,410 N, a temperature of 23° C., and 80 km/h. The reciprocal of rolling resistance was expressed as an index taking the value of Comparative Example 1 as 100. A larger index indicates lower rolling resistance and better fuel efficiency.

On-Ice Performance: Four tires were mounted on a 2,000 cc 4WD vehicle, run on an icy road (temperature: −3±3° C.) at 40 km/h, and then ABS-controlled, and the braking distance at this time was measured (average of n=10). The reciprocal of braking distance was expressed as an index taking the value of Comparative Example 1 as 100. A larger index indicates a shorter braking distance and better braking performance on an icy road surface.

TABLE 1

|  | Comparative Examples | | | | | Examples | | | | | |
|---|---|---|---|---|---|---|---|---|---|---|---|
|  | 1 | 2 | 3 | 4 | 5 | 1 | 2 | 3 | 4 | 5 | 6 |
| Formulation (part by mass) | | | | | | | | | | | |
| NR | 60 | 60 | 60 | 60 | 60 | 60 | 60 | 60 | 30 | 30 | 60 |
| ESBR | — | — | — | — | — | — | — | — | 40 | — | — |
| Modified SBR | — | — | — | — | — | — | — | — | — | 40 | — |
| BR | 40 | 40 | 40 | 40 | 40 | 40 | 40 | 40 | 30 | 30 | 40 |
| Carbon black | 40 | 40 | 40 | 40 | 40 | 40 | 40 | 40 | 40 | 40 | 40 |
| Silica | 10 | 10 | 10 | 10 | 10 | 10 | 10 | 10 | 10 | 10 | 10 |
| Paraffinic oil | 20 | 20 | 20 | 20 | 20 | 20 | 20 | 20 | 20 | 20 | 20 |
| Silane coupling agent | 1.0 | 1.0 | 1.0 | 1.0 | 1.0 | 1.0 | 1.0 | 1.0 | 1.0 | 1.0 | 1.0 |
| Oil-absorbent polymer particles | — | — | — | — | 30 | 2.5 | 5.0 | 10 | 10 | 10 | 10 |
| Polymethyl methacrylate | — | 5.0 | — | — | — | — | — | — | — | — | — |
| Silicone resin powder | — | — | 5.0 | — | — | — | — | — | — | — | — |
| Oil gelling agent | — | — | — | 5.0 | — | — | — | — | — | — | — |
| Plant-derived granular body | — | — | — | — | — | — | — | — | — | — | 5 |
| Stearic acid | 2.0 | 2.0 | 2.0 | 2.0 | 2.0 | 2.0 | 2.0 | 2.0 | 2.0 | 2.0 | 2.0 |
| Zinc oxide | 2.0 | 2.0 | 2.0 | 2.0 | 2.0 | 2.0 | 2.0 | 2.0 | 2.0 | 2.0 | 2.0 |
| Wax | 2.0 | 2.0 | 2.0 | 2.0 | 2.0 | 2.0 | 2.0 | 2.0 | 2.0 | 2.0 | 2.0 |
| Antioxidant | 2.0 | 2.0 | 2.0 | 2.0 | 2.0 | 2.0 | 2.0 | 2.0 | 2.0 | 2.0 | 2.0 |
| Vulcanization accelerator | 1.5 | 1.5 | 1.5 | 1.5 | 1.5 | 1.5 | 1.5 | 1.5 | 1.5 | 1.5 | 1.5 |
| Sulfur | 1.0 | 1.0 | 1.0 | 1.0 | 1.0 | 1.0 | 1.0 | 1.0 | 1.0 | 1.0 | 1.0 |
| Evaluation (index) | | | | | | | | | | | |
| Abrasion resistance | 100 | 98 | 95 | 98 | 85 | 100 | 100 | 100 | 105 | 105 | 102 |
| Rolling resistance performance | 100 | 102 | 103 | 100 | 108 | 102 | 105 | 107 | 105 | 108 | 105 |
| On-ice performance | 100 | 90 | 95 | 90 | 120 | 103 | 105 | 110 | 110 | 120 | 130 |

The results are as shown in Table 1. As compared with Comparative Example 1, which is a control, in Comparative Example 4 where an amino acid-based oil gelling agent was blended, the on-ice performance deteriorated. In Comparative Examples 2 and 3, the oil absorption of the added polymethyl methacrylate or silicone resin powder was low, and the on-ice performance deteriorated. In Comparative Example 5, the amount of oil-absorbent polymer particles blended was too large, and the abrasion resistance was impaired.

In contrast, in Examples 1 to 6, the on-ice performance and rolling resistance performance improved in a well-balanced manner without loss in abrasion resistance.

Some embodiments of the invention have been described above. However, these embodiments are presented as examples and not intended to limit the scope of the invention. These embodiments can be practiced in other various modes, and, without departing from the gist of the invention, various omissions, substitutions, and changes can be made thereto. These embodiments, as well as omissions, substitutions, and changes thereto, for example, fall within the scope and gist of the invention, and also fall within the scope of the claimed invention and its equivalents.

The invention claimed is:

1. A rubber composition for a studless tire, comprising:
a rubber component containing a natural rubber and a polybutadiene rubber;
oil-absorbent polymer particles having a glass transition temperature of −70 to −20° C., formed from a polymer whose molecular weight distribution is less than 3.0, and having an oil absorption of 100 to 1,500 ml/100 g; and an oil, the content of the oil-absorbent polymer particles being 0.5 to 25 parts by mass per 100 parts by mass of the rubber component.

2. The rubber composition for a studless tire according to claim 1, wherein the content of the oil is 1 to 15 times the content of the oil-absorbent polymer particles on mass basis.

3. The rubber composition for a studless tire according to claim 1, wherein 100 parts by mass of the rubber component contains 15 to 75 parts by mass of the natural rubber and 25 to 85 parts by mass of the polybutadiene rubber.

4. The rubber composition for studless tire according to claim 1, further comprising a filler in an amount of 20 to 150 parts by mass per 100 parts by mass of the rubber component, more than 50 mass % of the filler being carbon black.

5. The rubber composition for a studless tire according to claim 1, wherein the oil-absorbent polymer particles have been gelled with the oil, and the gelled oil-absorbent polymer particles form, as a dispersed phase dispersed in a matrix comprising the rubber component, a filler non-localized phase containing no filler.

6. A studless tire comprising a tread rubber including the rubber composition according to claim 1.

* * * * *